(12) United States Patent
Choi

(10) Patent No.: US 7,134,082 B1
(45) Date of Patent: Nov. 7, 2006

(54) METHOD AND APPARATUS FOR INDIVIDUALIZING AND UPDATING A DIRECTORY OF COMPUTER FILES

(75) Inventor: Chee Hung Ben Choi, Ruston, LA (US)

(73) Assignee: Louisiana Tech University Research Foundation as a division of the Louisiana Tech University Foundation, Ruston, LA (US)

( * ) Notice: Subject to any disclaimer, the term of this patent is extended or adjusted under 35 U.S.C. 154(b) by 534 days.

(21) Appl. No.: 10/005,026

(22) Filed: Dec. 4, 2001

(51) Int. Cl.
*G06F 3/00* (2006.01)

(52) U.S. Cl. .................................................. 715/745

(58) Field of Classification Search ........ 715/745–748, 715/734, 735, 738, 751, 853; 706/5, 15, 706/20, 45
See application file for complete search history.

(56) References Cited

U.S. PATENT DOCUMENTS

| | | | | |
|---|---|---|---|---|
| 5,749,081 | A * | 5/1998 | Whiteis | 707/102 |
| 5,799,292 | A * | 8/1998 | Hekmatpour | 706/11 |
| 5,918,014 | A * | 6/1999 | Robinson | 709/219 |
| 5,924,090 | A | 7/1999 | Krellenstein | |
| 6,020,884 | A * | 2/2000 | MacNaughton et al. | 715/747 |
| 6,078,916 | A * | 6/2000 | Culliss | 707/5 |
| 6,314,408 | B1 * | 11/2001 | Salas et al. | 705/54 |
| 6,401,094 | B1 * | 6/2002 | Stemp et al. | 707/10 |
| 6,412,012 | B1 * | 6/2002 | Bieganski et al. | 709/232 |
| 6,487,541 | B1 * | 11/2002 | Aggarwal et al. | 705/26 |
| 6,606,102 | B1 * | 8/2003 | Odom | 715/745 |
| 6,727,927 | B1 * | 4/2004 | Dempski et al. | 715/853 |
| 6,734,886 | B1 * | 5/2004 | Hagan et al. | 715/853 |
| 6,763,354 | B1 * | 7/2004 | Hosken | 707/6 |
| 6,785,671 | B1 * | 8/2004 | Bailey et al. | 707/3 |
| 6,850,255 | B1 * | 2/2005 | Muschetto | 715/788 |
| 6,944,829 | B1 * | 9/2005 | Dando | 715/798 |
| 6,961,909 | B1 * | 11/2005 | Lord et al. | 715/853 |
| 2005/0169255 | A1 * | 8/2005 | Shimomura et al. | 370/352 |

OTHER PUBLICATIONS

Screen Dumps of Netscape Communicator 4.75, 2000, pp. 1-5.*
Screen Dumps of Microsoft Windows NT, version 4.0, 1998, pp. 1-3.*
Apte, C., F. Damerau & S.M. Weiss (1994), "Automated Learning of Decision Rules for Text Categorization", ACM Trans. on Information Systems, 12(3), pp. 223-251.
Craven, M., S. Slattert & K. Nigam (1998), "First-Order Learning for Web Mining", Lecture Notes in Artificial Intelligence, 1398, pp. 250-255, Springer: Berlin.
Ittner, D., D. Lewis & D. Ahn (1995), "Text Categorization of Low Quality Images", Symposium on Document Analysis and Information Retrieval, pp. 301-515.

(Continued)

*Primary Examiner*—Kristine Kincaid
*Assistant Examiner*—Le Nguyen
(74) *Attorney, Agent, or Firm*—Jones, Walker, Waechter, Poitevent, Carrere, & Denegre, L.L.P.

(57) ABSTRACT

A method for individualizing an Internet/Intranet global directory and for adaptively changing the global directory structure based upon the individual alterations of multiple users. The method provides a default computer directory of prearranged files on a server computer. Client directory customization data is then provided to the server computer. With this information, the default directory is reconfigured into an individualized Internet/Intranet directory by modifying a copy of the default Internet/Intranet directory based upon the directory customization data. Further aspects include the step of updating the client directory customization data based upon user inputs; the step of collecting a history of client directory customization data; or the step of updating the default computer directory based on a history of client customization data.

32 Claims, 10 Drawing Sheets

User Interface Example

OTHER PUBLICATIONS

Joachims, T. (1997), "A Probabilistic Analysis of the Rocchio Algorithm with TFIDF for Text Categorization," Proc. of the 14th International Conference on Machine Learning, pp. 143-151.

Massand, B., G. Linoff & D. Waltz (1992), "Classifying New Stories Using Memory Based Reasoning", Proceedings SIGIR '92, pp. 59-65.

Mladenic, D. (1998), "Turning Yahoo Into an Automatic Web-Page Classifier", In H. Parde (Ed.), Proc. 13th European Conference on Artificial Intelligence, pp. 471-474, John Wiley & Sons: Chichester.

Passani, M. & D. Billsus (1997), "Learning and Revising User Profiles: The Identification of Interesting Web Sites", Machine Learning Journal, 23, pp. 313-331.

* cited by examiner

| Classifieds | | | | | |
|---|---|---|---|---|---|
| Menu Items *1* | | | *5* | | |
| Tool bar *2* | | *4* | | | |
| My Internet | Name | Description | Popularity | Modified | URL |
| Arts & Humanities | Audi *6* | Automobiles | 70% | 09/01/01 | www.carbuyers.com |
| Business & Economy *3* | Jobs | Employment opportunities | 55% | 08/12/01 | www.jobfinder.com |
| Business Libraries | Sports | Sporting goods | 44% | 07/23/01 | www.playhard.com |
| Classifieds | Home | Housing | 60% | 09/11/01 | www.yourhome.com |
| Employment & Work | | | | | |
| Computers | | | | | |
| Additional info for selected folder | Additional info for selected file or Advertisement | | | | |

Figure 1a. User Interface Example

| Employment & Work | | | | | |
|---|---|---|---|---|---|
| Menu Items *1* | *2* | | *5* | | |
| Tool bar | | *4* | | | |
| My Internet | Name | Description | Popularity | Modified | URL |
| Arts & Humanities | Jobs | Employment opportunities | 55% | 08/12/01 | www.jobfinder.com |
| Business & Economy *3* | | | | | |
| Business Libraries | | | | | |
| Classifieds | | | | | |
| Employment & Work | | | | | |
| Computers | | | | | |
| Additional info for selected folder | Additional info for selected file or Advertisement | | | | |

Figure 1b. User Interface Example

| Classifieds | 3 | | | |
|---|---|---|---|---|
| Menu Items | | | 5 | |
| Tool bar | 4 | | | |
| Name | Description | Popularity | Modified | URL |
| Audi | Automobiles | 70% | 09/01/01 | www.carbuyers.com |
| Jobs | Employment opportunities | 55% | 08/12/01 | www.jobfinder.com |
| Sports | Sporting goods | 44% | 07/23/01 | www.playhard.com |
| Home | Housing | 60% | 09/11/01 | www.yourhome.com |
| | Additional info for selected file or Advertisement | | | |

Figure 2a. User Interface Example

| Employment & Work | 3 | | | |
|---|---|---|---|---|
| Menu Items | | | 5 | |
| Tool bar | 4 | | | |
| Name | Description | Popularity | Modified | URL |
| Jobs | Employment opportunities | 55% | 08/12/01 | www.jobfinder.com |
| | Additional info for selected file or Advertisement | | | |

Figure 2b. User Interface Example

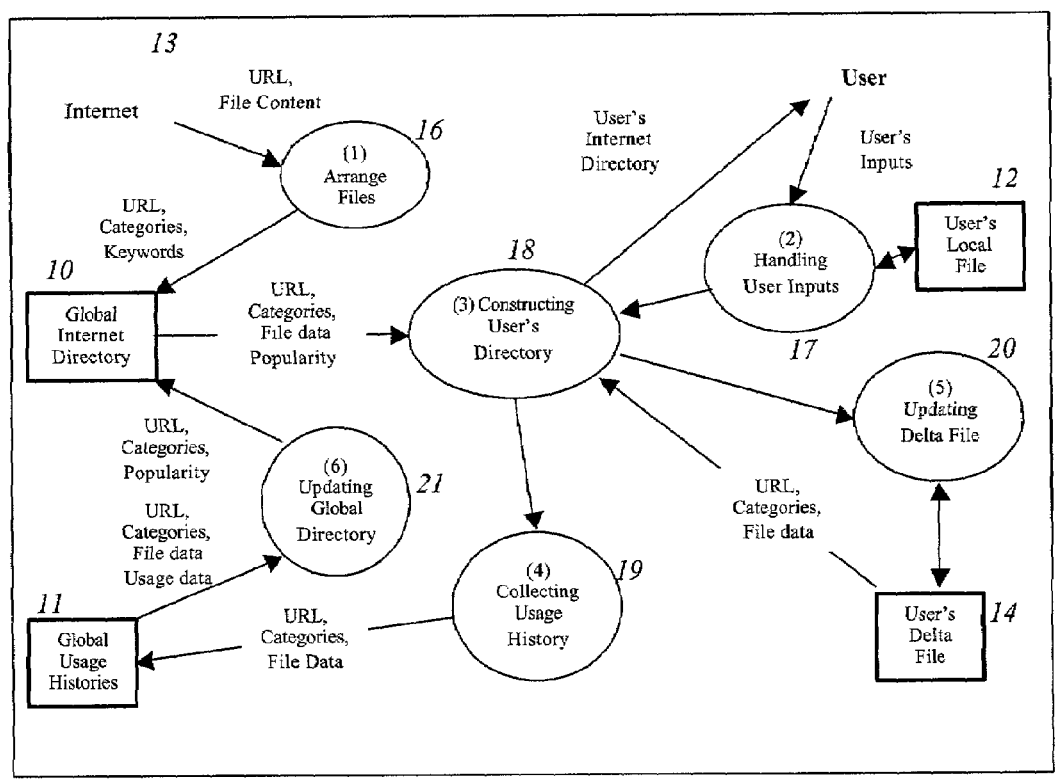
Figure 3. Dataflow Diagram

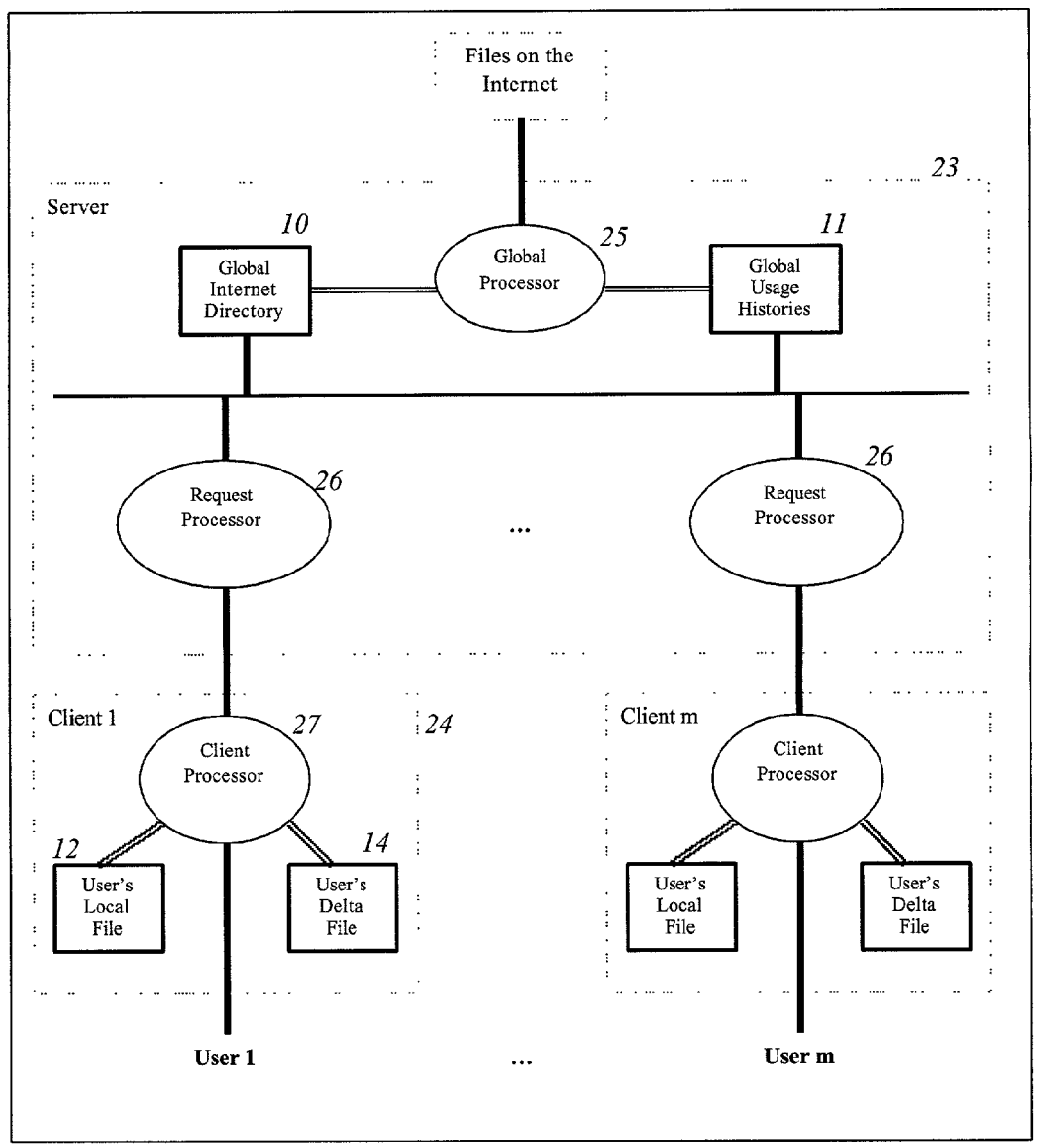
Figure 4. Block Diagram of the Invention

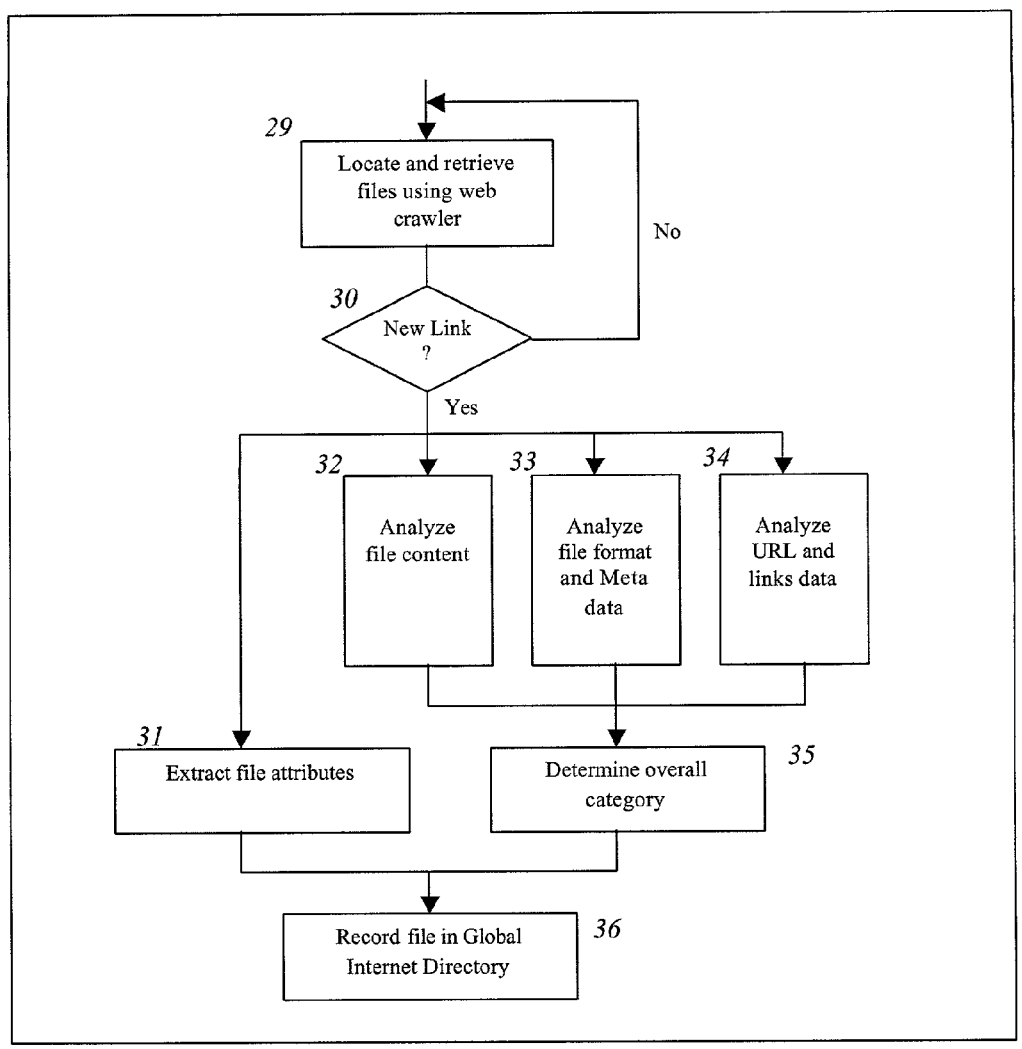
Figure 5. Process (1) Arrange Files to Create a Global Internet Directory

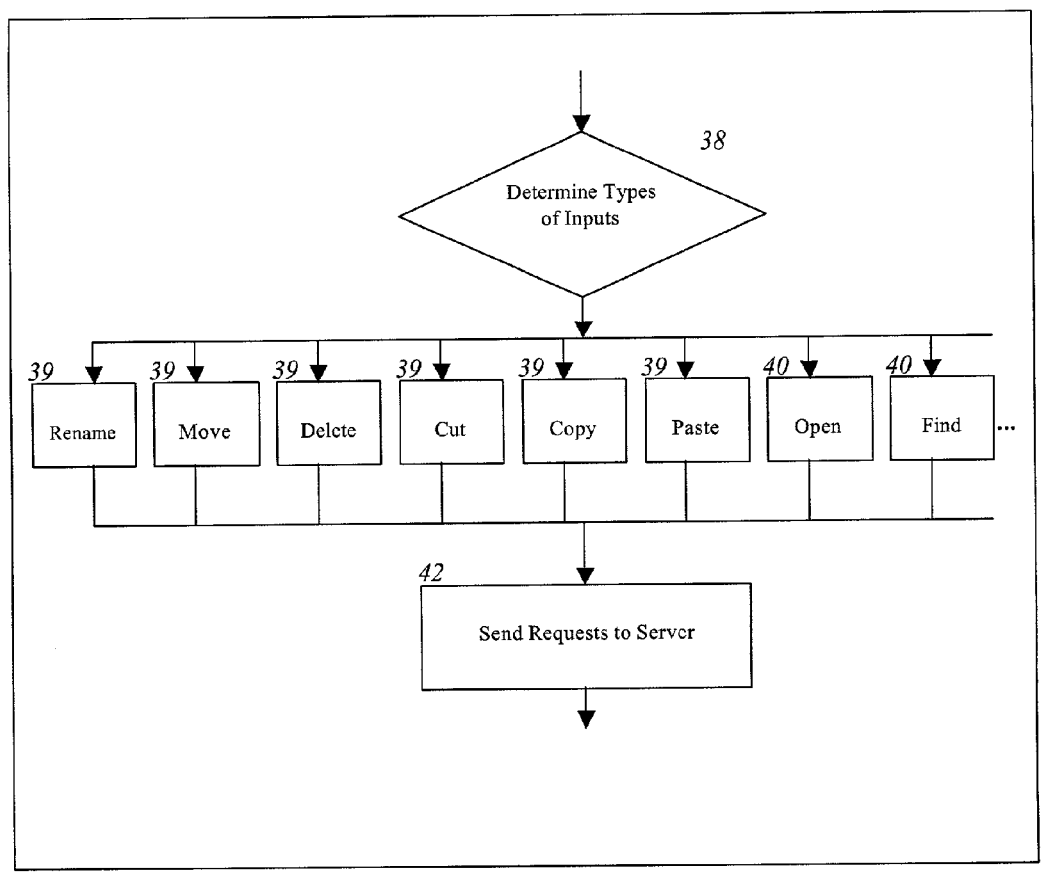
Figure 6. Process (2) Handling User's Inputs

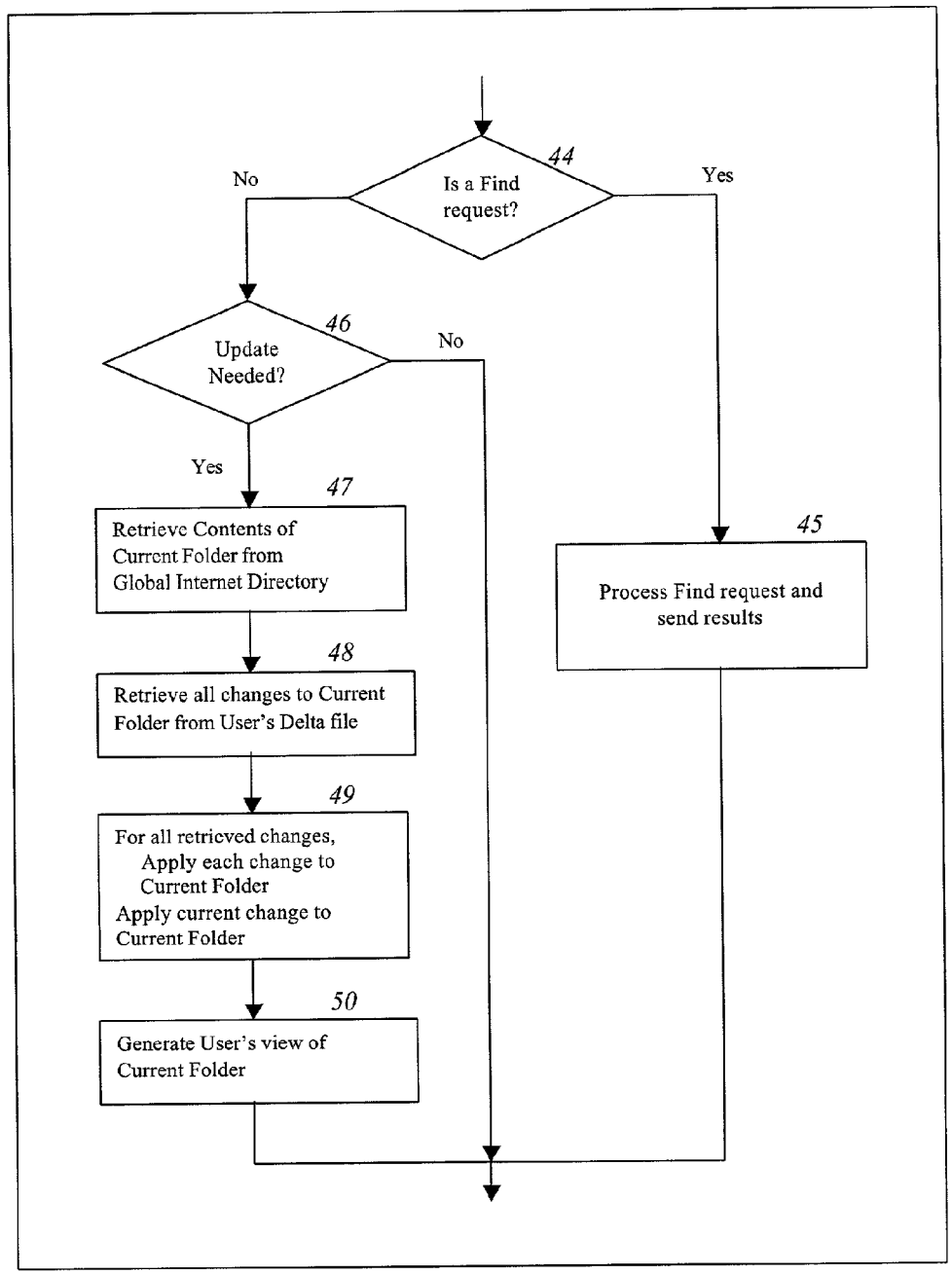
Figure 7. Process (3) Constructing User's Directory

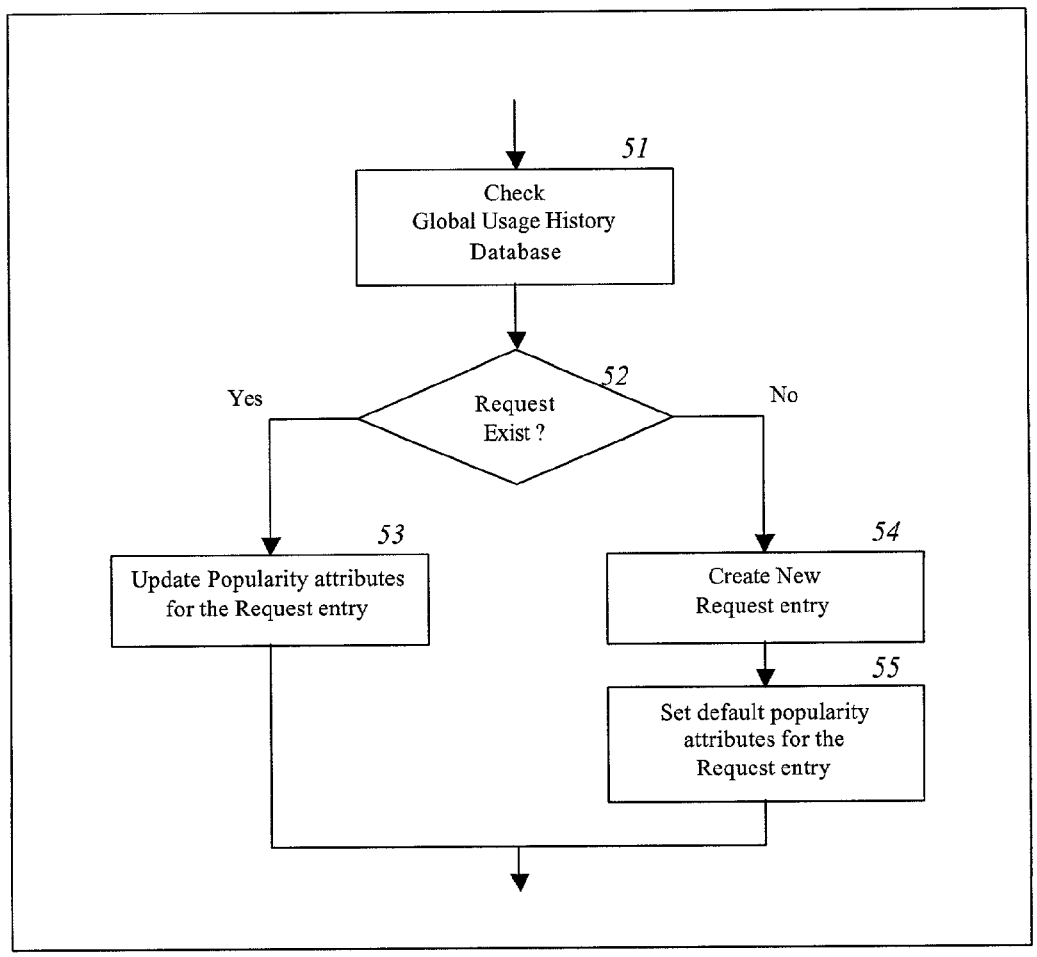
Figure 8. Process (4) Collecting Usage History

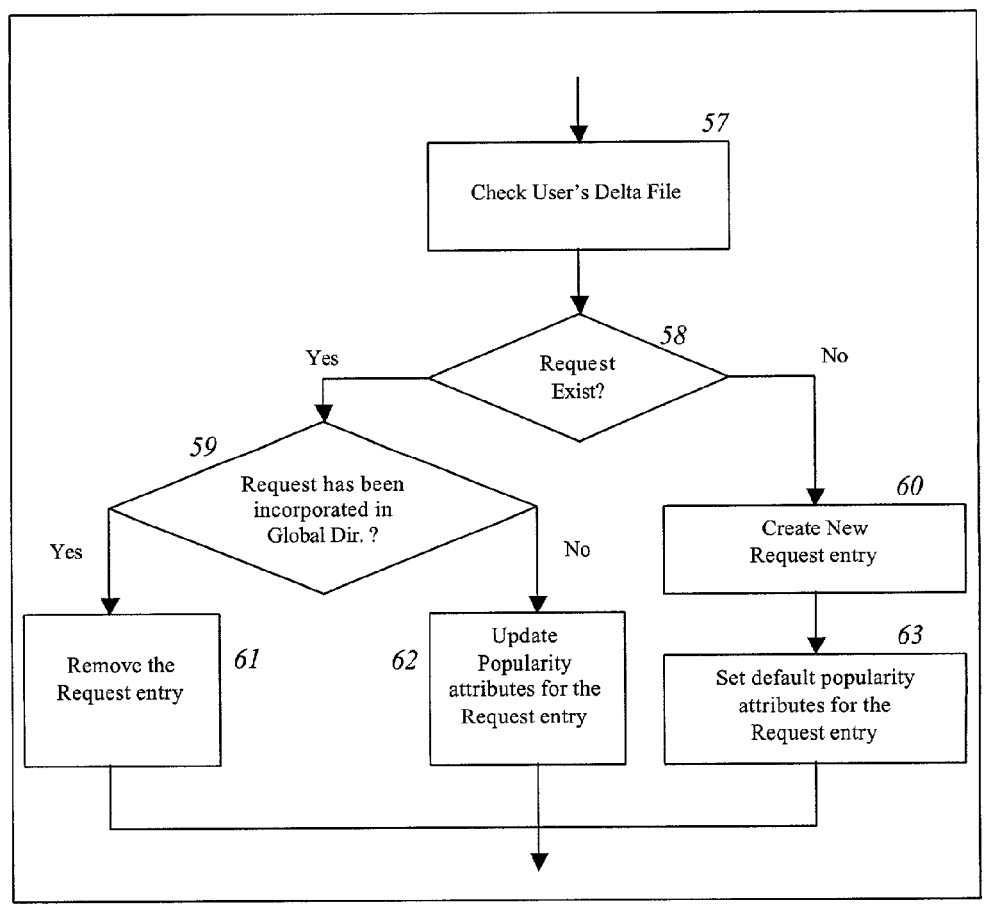
Figure 9. Process (5) Updating Delta Files

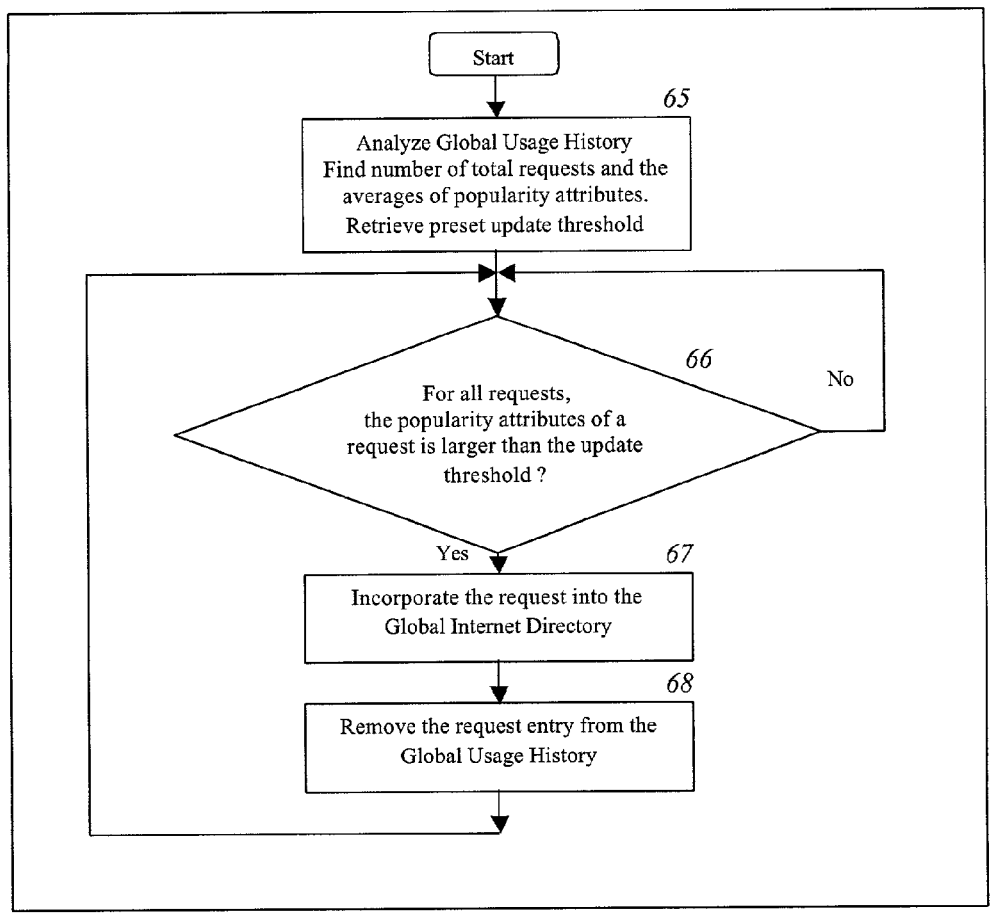
Figure 10. Process (6) Updating Global Directory based on Global Usage History

METHOD AND APPARATUS FOR INDIVIDUALIZING AND UPDATING A DIRECTORY OF COMPUTER FILES

FIELD OF THE INVENTION

The present invention relates generally to a method and apparatus for allowing multiple users to arrange and modify a global directory of files stored on the Internet or an Intranet. In particular, the present invention relates to a method and apparatus of sharing and adaptively changing a global Internet or Intranet directory such that each of multiple users will have a local customized view of the directory.

BACKGROUND OF INVENTION

The Internet contains vast amount of information stored in files located in computing systems all over the world. One of the most significant problems of using the Internet is how to find particular information in this vast network of computers. Search engines are created to address this problem. Search engines allow user to provide a few keywords and retrieve files that match those keywords. Nowadays, a simple keyword search on the Internet may return thousands (even hundreds of thousands) of web pages. To find the desired information, a user may have to scan the outlines of hundreds web pages; a task that virtually no user has the time and patience to perform. One technique that has been developed to decrease the amount of time spent searching for desired information is arranging web pages into categories.

From the point of view of web-page classification, conventional search engines can be grouped into three classes: manual classification, non-classification, or automatic classification. Generally speaking, the current state of the art is that there is one search engine utilizing manual classification, one utilizing automatic classification, and the remaining search engines either provide no classification or only rudimentary manual classification. However, none of the current search engines allow a user to customize the categories to meet the user's individual needs and preferences.

Yahoo (www.yahoo.com) is a popular search engine that manually classifies web pages into subjects (such as, Arts & Humanities, Business & Economy, Computers & Internet, and Education, each of which is further classified into sub-categories, thereby forming a directory structure). The manual classification process usually begins with users who submit suggested subjects for their web sites or web pages. The sites are then placed in categories by people (called Surfers) who visit and evaluate the suggestions and decide where they best belong. By using this manual process, Yahoo ensures the classification is done in the best (humanly) possible way. However, since the manual process is labor intensive and relatively slow compared to the rapid growth of web pages, Yahoo can now only classify a small percentage of web pages (estimated to be less than 10%). This manual process simply cannot keep up with the explosive growth of the web. Thus, the percentage of manually classified web pages is estimated to be getting smaller and smaller.

As mentioned above, most search engines (such as, AltaVista, Excite, Go (formerly Infoseek), DirectHit, Google, and Lycos) do not provide classification of web pages (or only rudimentary manual grouping of a few pages). With the exception of DirectHit, these search engines rank search results based on factors such as the location of the keywords and the number of occurrences of the keywords. For example, if the keywords are located in the title of a web page, then the web page is rated higher than other web pages that contain the same keywords in the body.

DirectHit (www.directhit.com), on the other hand, ranks search results based on the usage history of millions of Internet searchers. This ranking is based on a number of usage factors, such as the number of users who select a web page and the amount of time the users spend at the web page. By presenting the higher ranked pages first, one can see and find the most popular pages or sites.

Northern Light (www.northernlight.com) is one of the first search engines to incorporate automatic web-page classification. Northern Light organizes search results into categories by subject, type, source, and language. The categories are arranged into hierarchical folders much like a directory structure. The arrangements and the choices of the categories are unique to each search and generated based on the results of the search.

The automated categorization of web documents has been investigated for many years. For example, Northern Light received a U.S. Pat. No. 5,924,090 for their classification mechanisms. Mladenic (1998) has investigated the automatic construction of web directories, such as Yahoo. In a similar application, Craven et al. (1998) intend to use first-order inductive learning techniques to automatically populate an ontology of classes and relations of interests to users. Pazzani and Billsus (1997) apply Bayesian classifiers to the creation and revision of user profiles. WebWather (Joachims et al., 1997) performs as a learning apprentice that perceives user's actions when browsing on the Internet, and learns to rate links on the base of current page and the user's interests. For the techniques of construction of web page classifiers, several solutions have been proposed in the literature, such as Bayesian classifiers (Pazzani & Billsus, 1997), decision trees (Apte et al., 1994), adaptations of Rocchio s algorithm to text categorization (Ittner et al., 1995), and k-nearest neighbor (Masand et al., 1992). An empirical comparison of these techniques has been performed by Pazzani and Billsus (1997). The conclusion was that the Bayesian approach leads to performances at least as good as the other approaches.

However, nothing in the prior art systems allows multiple users the freedom to customize or individualize a global Internet or Intranet directory structure of categories and allows the global directory structure to change adaptively based on all of the user's customizations. Such a system would be a significant advance in the art and is disclosed in the following description.

SUMMARY OF INVENTION

The present invention provides a method for individualizing an Internet/Intranet global directory and for adaptively changing the global directory structure based upon the individual alterations of multiple users. The method provides a default computer directory of prearranged files on a server computer. Client directory customization data is then provided to the server computer. With this information, the default directory is reconfigured into an individualized Internet/Intranet directory by modifying a copy of the default Internet/Intranet directory based upon the directory customization data.

Further aspects of the present invention include the step of updating the client directory customization data based upon user inputs; the step of collecting a history of client directory customization data; or the step of updating the default computer directory based on a history of client customization data.

BRIEF DESCRIPTION OF DRAWINGS

FIG. 1a is a representation of screen view of one type of directory that could be employed as a user interface in the present invention.

FIG. 1b is the screen view of FIG. 1a illustrating certain modifications of the directory.

FIGS. 2a and 2b represent another type of directory that may be used as a user interface in the present invention.

FIG. 3 is a schematic description of the overall operation of the present invention.

FIG. 4 is a block diagram of the client/server relationship in the present invention.

FIG. 5 is a flow chart illustrating how files are arranged to create the global Internet directory.

FIG. 6 is a flow chart illustrating how the invention processes user inputs.

FIG. 7 is a flow chart illustrating how the invention constructs a user's individualized directory.

FIG. 8 is a flow chart illustrating how the invention collects the usage history.

FIG. 9 is a flow chart illustrating how the invention updates the directory customization data file.

FIG. 10 is a flow chart illustrating how the invention updates the global directory.

DETAILED DESCRIPTION OF INVENTION

The present invention provides a method for allowing an Internet/Intranet user to create a customized directory of web pages or files. One example of the functionality of the present invention may be explained graphically in reference to FIGS. 1a and 1b. FIGS. 1a and 1b represent screen views of how one embodiment of the present invention might be viewed by a user on his or her computer monitor. Generally, FIGS. 1a and 1b show an Internet directory 1, which may include multiple folders 2 (of the same level), multiple sub-folders 3, or any level of sub-sub-folders existing in directory 1. When a user selects the lowest level folder (such as by clicking on the folder with a mouse) as suggested by the shaded "classifieds" folder in FIG. 1a, window 5 will be presented with a series of files 4. Files 4 generally represent an actual website address or uniform resource locator (URL). Window 5 may present various attributes concerning a file 4, such as a description of the website subject matter, a popularity rating for the website, the date the website was last modified, and the URL for the website. Naturally, these attributes are merely illustrative and many other attributes of a file 4 could be identified and displayed. While not explicitly shown in FIG. 1a, it will be understood that folders 2 and sub-folders 3 could also be assigned various attributes. The attributes of a folder or file may be employed by the user in making decisions on how to characterize, prioritize and organize files and folders 1 when using the present invention.

In a broad sense, one function of the present invention may be described as a method of allowing a user to create a customized or individualized Internet directory. For example, FIG. 1a illustrates the file "Jobs" appearing in the folder "Classifieds." If a user wished to relocate the "Jobs" file to another folder, such as the Employment and Work folder as suggested by the dashed arrow 6, the present invention allows a user to move the "Jobs" file to the Employment and Work folder. The moving of a file could be accomplished by any conventional user interface method, such as clicking and dragging the file with a mouse, selecting cut and paste from a pop-up menu as described below in reference to FIGS. 2a and 2b, or entering command terms through the keyboard. The result of this operation is shown in FIG. 1b, which illustrates the Employment and Work folder being selected, the associated window 5 being opened, and the "Jobs" file now appearing in the Employment and Work folder. While the preceding example describes a move type function, the invention naturally includes many more functions such as deleting files, copying files, renaming files, creating files and other conventional file management functions. Of course, folders and sub-folders may be manipulated in the same manner as files.

On the other hand, FIGS. 2a and 2b represent another common type of user interface. This type of user interface is more readily implemented within a web browser. A window 5 will display sub-folder 3 containing the same group of files 4 as seen in FIGS. 1a and 1b. While FIGS. 2a and 2b show the folder at the level of sub-folder 3 displaying a list of files 4, it will be understood that the next higher level folder (at the level of folder 2 seen in FIGS. 1a and 1b) 1 would display a list of sub-folders 3. Naturally, this progression of generality would continue until the highest level folder (e.g. My Internet in FIG. 1a) was reached. Rather than using the click and drag technique described for FIGS. 1a and 1b, the interface in FIGS. 2a and 2b will arrange files using commands from a pop-up menu or the keyboard. For example, to move the "Jobs" file shown in the Classifieds folder in FIG. 2a to the Employment & Work folder in FIG. 2b, a user would normally select the Jobs file in the Classifieds folder and enter a cut command through pop-up menu or keyboard shortcut. The user would then close the Classifieds folder, open the Employment & Work folder, and enter a paste command to place the Jobs file in the Employment & Work folder. The type of user interface seen in FIGS. 2a and 2b is more readily implemented with conventional web browsers than an interface using the click and drag technique.

The ability of the present invention to create an individualized Internet/Intranet directory generally comprises three basic steps. First, the invention provides a default computer directory of prearranged files on a server computer; second, the invention provides client directory customization data to the server computer; and third, the default directory is reconfigured into an individualized Internet directory by modifying the default Internet directory based upon the directory customization data. While the term Internet is used throughout this specification for simplicity, it will be understood that the invention is applicable to any network of computers, whether it is the Internet, an Intranet, or another network type.

FIG. 3 is a dataflow diagram illustrating an overall view of how one embodiment of the present invention will function. In FIG. 3, the default directory is represented as global Internet directory 10. Global directory 10 will be an organized collection of individual web pages (files 13) existing on the networked computers located all over the world, which form the Internet. Global directory 10 will preferably be constructed by automated searching and classifying software such as discussed below. The directory will contain links to the files and it will group the files into meaningful categories (folders). The Global directory 10 will be constructed by 1 searching for and arranging files as suggested in step 16. Typically, this will be accomplished through the use of web crawlers or similar programs that automatically locate and retrieve web pages. The web pages retrieved by the web crawlers will then be subject to a classification process that analyzes and places the web pages into an appropriate folder such as seen in FIG. 1a. This process will also be used to periodically update the global Internet directory to add new files and delete obsolete files.

To construct an individualized Internet directory, it is necessary to reconfigure the global directory 10 based on directory customization data. Still viewing FIG. 3, this directory customization data is represented by data stored in a user customization file, or as referred to herein, a user's delta file 14. Delta file 14 is essentially a record of all changes a user has made over time to the global directory 10 in order to construct the individualized directory. For example, when a user employs the present invention for the first time, delta file 14 will be empty and the user will view global directory 10. However, when the user moves, copies, deletes, etc. files as suggested in FIGS. 1 and 2, a history of those modifications is stored in delta file 14. This is represented in FIG. 3 by step 20 that consists of updating delta file 14. Each time the user begins a new session on the Internet and accesses his or her individualized directory, delta file 14 will be read and global directory 10 modified to reflect the history of changes made by the user, thus creating the individualized user directory as processed by step 18. As the user makes further changes to the individualized directory, the changes will be immediately implemented as reflected in step 17 and then delta file 14 is again updated in step 20. This specification uses modify or modification to mean any rearrangement, change, or reorganization of global directory 10 and commands such as open, cut, paste, delete, and rename are only nonexclusive examples of such modifications. A user local file 12 will typically provide local storage for various purposes, such as creating a new file. Delta file 14 is not limited to storing data for the modification of global directory 10. Delta file 14 may also contain data for referencing files existing on the client computer's hard disk drive or existing on an Intranet to which the client computer is connected. Thus, the individualized directory may include not only files located on the Internet, but also files stored either on the client computer or located on an Intranet.

The above described creation of the individualized user directory does not alter global directory 10 as that directory resides on a server, but only alters the view of global directory 10 provided to the user. However, another aspect of the present invention will include a method of actually modifying or updating global directory 10 itself based upon the usage history of the user community as a whole. When a user requests an alteration of the configuration of global directory 10 in creating the user individualized directory, the user's requested alteration is collected (see step 19) and stored in a global usage history database 11. Thus, a history of all alterations by all users is stored in global usage history database 11. When a certain user alteration reaches a predetermined statistical threshold (e.g. a majority of users make this particular alteration), an updating procedure as suggested in step 21 will actually modify or update global directory 10 itself to incorporate the preference a majority of users have demonstrated. Referring to FIGS. 1 and 2 as an example, FIG. 1a could be considered the initial arrangement of global directory 10 having the "Jobs" file positioned in the Classifieds folder. However, if a sufficient number of users preferred to move the Jobs file to the Employment and Work folder, the next time global directory 10 was updated, global directory 10 would be arranged to move the Jobs file to the Employment and Work folder. After this point, a new user viewing global directory 10 for the first time would see the Jobs file appearing in the Employment and Work rather than the Classifieds folder. As mentioned above, the updating of global directory 10 will include changes to files on the Internet. Thus, new files appearing on the Internet will be classified and added to global directory 10 while obsolete files are removed from global directory 10. As described below, this will also ultimately result in modification to delta file 14.

FIG. 4 schematically represents the relationship between client and server computers in carrying out one embodiment of the present invention. Server 23 will included global processor 25, multiple request processors 26, and databases comprising the global directory 10 and global usage history 11. Server 23 will communicate with a multitude of client computers 24 through conventional network connections such as Internet connections, LAN connections, etc. Each client 24 may include a client processor 27, a delta file 14 and a local file 12.

Each request processor 26 in server 23 is intended to process the requests of one client 24. Each request processor 26 could be separate hardware processing unit or each request processor 26 could be a software process being executed by a single hardware processing unit operating in a multi-tasking mode. When client 24 seeks to access its individualized directory, request processor 26 will receive the content of the user's delta file 14. By accessing global directory 10 and utilizing the information from the delta file 14, request processor 26 may construct the individualized directory associated with that client 24. The individualized directory is then transmitted through request processor 26 to client 24. Naturally, it is not strictly necessary that the entire contents of delta file 14 be used to modify global directory 10. There may be instances where only a portion of delta file 14 would be used or only a portion of global directory 10 would be made accessible for modification. All such variations are within the scope of the present invention.

Moreover, while FIG. 4 illustrates a client/server architecture with a separate processor for each user, the present invention also includes a system where a single processor or computer could support many different users. In such a system, the computer would maintain a separate delta file 14 for each user. When a user requests to view his or her individualized directory, the delta file 14 associated with that particular user would be read and global directory 10 modified accordingly. In this manner, as single computer could provide individualized directories for a large number of users. Additionally, while the embodiment seen in FIG. 4 suggests that each user's delta file 14 will be stored at the location of the client and that the global directory 10 and global usage history 11 will be stored at the server, this need not be the case. All information in these files and directories could be stored in a database remote from the client or the server and accessed through conventional electronic data links.

The various functions described above are shown in more detail with reference to FIGS. 5–10. While global directory 10 could be an existing Internet directory structure such as at Yahoo.com, it is advantageous to employ a directory that may be automatically organized and updated. FIG. 5 illustrates how files may be automatically located, retrieved, and organized into global directory 10. Step 29 represents locating and retrieving files from the Internet using a conventional web crawler program, such as Mycrawler Pro developed by Teleduction and Internet Ltd. For each file (web page) located by the web crawler, step 30 will determine if this file is a new file or if the file already exists in global directory 10. If the file already exists, the file is disregarded and then a new file is received from the web crawler program. If the file does not exist in global directory 10, several aspects of the file will be analyzed. Steps 32, 33 and 34 analyze information such as file content, file format, Meta data, the file s URL, and information concerning the types of links contained within the file. This information is then used to determine the overall category of the file in step 35 and store the file in global directory 10 (step 36). Additionally, various attributes such as date modified, file size, and file type will be extracted from the file in step 31. The process ultimately records the file in selected folder with the given attributes as suggested in FIG. 1*a*. While not employing exactly the same classification process as described in FIG. 5, a conventional search engine which has the ability to automatically classify files and which could be used to form the global directory 10 is the search engine produced by Northern Light of Cambridge, Mass.

FIG. 6 illustrates one embodiment for receiving and handling a user's input. Step 38 determines the type of user input, with exemplary directory arrangement functions 39 (e.g. rename, move, delete, cut, copy, paste, etc.), and directory navigation functions (e.g. open command 40 and find command 41). After determination of the input function being requested by the user, the input is sent to the server as represented in step 42. FIG. 7 illustrates the next series of steps in processing a user's input. If the requested function is a find (or search) function 44, the request is routed to the search routine 45 which will carry out the search. If the request is not for the find function 44, step 46 will determine whether an update is needed of the screen being viewed by the user. For example, a copy function does not alter the screen being view by the user and would not require processing through steps 47–50. Alternatively, functions such as open, move, delete and others do require changing the view of the screen. The updating of the view would require first retrieving the contents of the current folder that the user was viewing from the global directory (step 47). There would also be a retrieval from the delta file of changes the user has previously made to that folder (step 48). Step 49 applies the changes from the delta file to the global directory folder in addition to making the current change dictated by the user's specific function request. With these changes made to the global directory folder, the program may generate the current view of the user's individualized directory folder as in step 50.

Another function described above is the updating of the global directory. In order to accomplish this, the present invention must collect the usage history of at least numerous, but preferably all users. FIG. 8 illustrates in greater detail the steps required to collect a usage history. Each time a user sends a request to the server to modify the view of global directory to create the individualize directory, step 51 checks the request against an existing global usage history of all changes to the global directory previously requested by users. If the condition that the request already exists (step 52) is met, step 53 will update the popularity attributes of that particular request. By way of example, the popularity attributes could include factors such as the number of open functions preformed on a particular file, the number of times a file has been move from one folder to another folder, the number of times a file has been renamed, or other statistical data. If the request does not exist, step 54 records the request as a new request entry and step 55 sets the default popularity attributes of the new request entry. Thus, a global usage history will be compiled on this request entry when and if other users begin to make the same request.

Still another function describe above was the updating of the user's delta file. FIG. 9 illustrates the steps for carrying out this function. Each time a request entry for changing the global directory is received, step 57 compares this entry to the existing delta file while step 58 determines whether the new request entry exists. If the request does exist, step 59 determines if the request has already been incorporated into the global directory. If yes, the request is redundant and step 61 removes the request from the delta file. If no, step 62 updates the popularity attributes for the request. However, if the request does not exist in the condition of step 58, a new request entry is created in the delta file (step 60) and default popularity attributes are set for the request entry (step 63).

FIG. 10 illustrates the above described function of updating the global directory. Step 65 carries out the analyzing of the global usage history. This will include retrieving data on the total number of the requests (i.e. requests for modification to the global directory) made by all users, the number of requests made for a particular modification (or entry), the average popularity attributes for a particular modification, and the preset update threshold. The average popularity attributes will normally be calculated as a ratio of the number of requests made for a particular modification to the total number of requests made by all users. Step 66 will determine whether the popularity attributes exceed the update threshold. If no, a different request will be analyze as in step 66. If yes, step 67 will alter the global directory so that the request now becomes part of the global directory. Finally, step 68 involves the removal of the requested modification on the global usage history database once the global directory has been updated in regards to the particular request. While it is generally preferred to use all available global usage history information when updating the global directory, it is certainly within the scope of the present invention to use less than all of the available global usage history in the updating procedure.

It can be seen how the foregoing description discloses a novel and advantageous method of creating an individualized Internet directory. Of course, the above description discloses but one embodiment of the present invention. Many modifications to the invention could be made, such as the server being accessed through a website connection using the browser or using a stand alone application, or the default global directory being an existing file directory structure of an operation system (such as file directory of MS-DOS). The modifications performed on files applies equally to folders. Wherever the term file is used, it should be interpreted to include folders and visa versa. Also, the term computer as used herein is intended to include PALM-like devices, PDA s, or any other electronic device having a processor and operating on a set of software instructions. Those skilled in the art will recognize that all of these variations and/or modifications could be made without departing from the basic inventive concept. All such variations and/or modifications are intended to come with in the scope of the following claims.

REFERENCES

Apte, C., F. Damerau, & S. M. Weiss (1994). Automated learning of decision rules for text categorization. *ACM Trans. on Information Systems*, 12(3), pp. 223–251.

Craven, M., S. Slattert, & K. Nigam (1998). First-order learning for web mining. *Lecture Notes in Artificial Intelligence*, 1398, pp. 250–255, Springer: Berlin.

Ittner, D., D. Lewis, & D. Ahn (1995). Text categorization of low quality images. *Symposium on Document Analysis and Information Retrieval*, pp. 301–515.

Joachims, T. (1997). A probabilistic analysis of the Rocchio algorithm with TFIDF for text categorization. *Proc. of the 14th International Conference on Machine Learning*, pp. 143–151.

Massand, B., G. Linoff, & D. Waltz (1992). Classifying new stories using memory based reasoning. *Proceedings SIGIR '92*, pp. 59–65

Mladenic, D. (1998). Turning Yahoo into an automatic web-page classifer. In H. Parde (Ed.), *Proc. 13th European Conference on Artifical Intelligence*, pp. 471–474, John Wiley & Sons: Chichester.

Pazzani, M. & D. Billsus (1997). Learning and revising user profiles: The identification of interesting web sites. *Machine Learning Journal,* 23, pp. 313–331.

I claim:

1. A method for creating an individualized directory of computer files, comprising:
   a. providing a set of prearranged computer files forming a global default directory;
   b. maintaining user customization data in a user customization data file; and
   c. automatically, without user intervention, reconfiguring a copy of a portion of said global default directory based on said user customization data file, thereby creating an individualized view of a user directory; and
   d. adding files into or removing files from said global default directory.

2. A method according to claim 1 wherein said global default directory includes files in the Internet and/or an Intranet.

3. A method according to claim 1 further allowing multiple client computers to access said global default directory on a server computer.

4. A method according to claim 1 further comprising storing user customization data in a user computer.

5. A method according to claim 1 further comprising providing a user interface for a user to modify files in said user directory.

6. A method according to claim 5 wherein said modification of files in said user directory is at least one of either opening, cutting, copying, pasting, deleting, or renaming.

7. A method according to claim 5 further comprising updating said user customization data file based on the arrangements or modifications by a user.

8. A method according to claim 1 further comprising collecting user customization data from multiple users in order to form a global usage history.

9. A method according to claim 8 further comprising sending each user request of a file or folder modification from a client computer to a server computer.

10. A method according to claim 8 further comprising updating said global usage history based on subsequent user requests to modify or arrange files or folders.

11. A method according to claim 10 further comprising recording a particular directory modification specified by a user request and the number of requests specifying a particular modification.

12. A method according to claim 8 further comprising storing said global usage history in a database.

13. A method according to claim 8 further comprising updating said global default directory based on said global usage history.

14. A method according to claim 13 further comprising adding, removing, or renaming files or folders in said global default directory based on said global usage history.

15. A method according to claim 14 further comprising modifying attributes of files or folders in said global default directory based on said global usage history.

16. An apparatus for creating an individualized directory of computer files, comprising:
    a. a means for providing a set of prearranged computer files forming a global default directory;
    b. a means for maintaining user customization data in a user customization data file;
    c. a means for automatically reconfiguring a copy of a portion of said global default directory based on said user customization data file, thereby creating an individualized view of a user directory; and
    d. a means for adding files into or removing files from said global default directory.

17. An apparatus according to claim 16 wherein said global default directory includes files in the Internet and/or Intranet.

18. An apparatus according to claim 16 further comprising means for sharing said global default directory for allowing multiple client computers to access said global default directory on a server computer.

19. An apparatus according to claim 16 further comprising storing each user's customization data in a user computer.

20. An apparatus according to claim 16 further comprising means for providing a user interface for a user to arrange or modify files in said individualized user directory.

21. A apparatus according to claim 20 wherein said modification of files in said individualized user directory is at least one of either opening, cutting, copying, pasting, deleting, or renaming.

22. An apparatus according to claim 20 further comprising means for updating said user customization data file based on the arrangements or modifications by a user.

23. An apparatus according to claim 16 further comprising means for collecting user customization data from multiple users in order to form a global usage history.

24. An apparatus according to claim 23 further comprising means for sending each user request for a file or folder modification from a client computer to a server computer.

25. An apparatus according to claim 23 further comprising updating said global usage history based on subsequent user requests to modify or arrange files or folders.

26. An apparatus according to claim 25 further comprising recording a particular directory modification specified by a user request and the number of requests specifying a particular modification.

27. An apparatus according to claim 23 further comprising storing said global usage history in a database.

28. An apparatus according to claim 23 further comprising means for updating said global default directory based on said global usage history.

29. An apparatus according to claim 28 further comprising adding, removing, or renaming files or folders in said global default directory based on said global usage history.

30. An apparatus according to claim 29 further comprising modifying attributes of files or folders in said global default directory based on said global usage history.

31. A method according to claim 1 wherein said global default directory is a global Internet directory.

32. An apparatus according to claim 16 wherein said global default directory is a global Internet directory.

* * * * *